United States Patent
Brown et al.

(10) Patent No.: US 12,066,026 B2
(45) Date of Patent: Aug. 20, 2024

(54) ELECTRIC SUBMERSIBLE PUMP (ESP) ASSEMBLY WITH LOAD ABSORBING COUPLING

(71) Applicant: Halliburton Energy Services, Inc., Houston, TX (US)

(72) Inventors: Donn Jason Brown, Tulsa, OK (US); Ketankumar Kantilal Sheth, Tulsa, OK (US); Randy Louis Mathes, II, Tusla, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/551,386

(22) Filed: Dec. 15, 2021

(65) Prior Publication Data

US 2023/0184253 A1    Jun. 15, 2023

(51) Int. Cl.
| | |
|---|---|
| *F04D 13/02* | (2006.01) |
| *E21B 17/02* | (2006.01) |
| *E21B 43/12* | (2006.01) |
| *F04D 13/08* | (2006.01) |
| *F04D 13/14* | (2006.01) |
| *F04D 29/054* | (2006.01) |
| *F16D 3/10* | (2006.01) |

(Continued)

(52) U.S. Cl.
CPC ............ *F04D 13/021* (2013.01); *E21B 17/02* (2013.01); *E21B 43/128* (2013.01);
(Continued)

(58) Field of Classification Search
CPC ........ F16D 2001/103; F16D 1/06; F16D 1/10; F16D 1/02; F16D 1/112; F16D 3/10;
(Continued)

(56) References Cited

U.S. PATENT DOCUMENTS

| | | | | |
|---|---|---|---|---|
| 4,132,090 A | * | 1/1979 | McDermott | B23F 5/24 409/12 |
| 6,381,933 B1 | * | 5/2002 | Wanner | F16D 1/05 464/88 |

(Continued)

FOREIGN PATENT DOCUMENTS

| | | | |
|---|---|---|---|
| JP | 2007285474 A | * | 11/2007 |
| WO | 2021212105 A1 | | 10/2021 |

OTHER PUBLICATIONS

International Search Report and Written Opinion dated Jan. 26, 2023 for PCT Patent Application No. PCT/US2022/078093 filed on Oct. 14, 2022.

*Primary Examiner* — Dominick L Plakkoottam
(74) *Attorney, Agent, or Firm* — K&L Gates LLP

(57) ABSTRACT

An electric submersible pump (ESP) assembly that includes an electric motor with a splined drive shaft with drive shaft teeth, an ESP mechanically coupled to the electric motor that includes a splined ESP shaft with ESP shaft teeth, and a downhole component mechanically coupled to the electric motor that includes a splined component shaft with component shaft teeth. Splined couplings each include a central axis and grooves through the coupling with groove sidewalls sized to receive the shaft teeth. The grooves are angled relative to the central axis to form a space on either side of each tooth in each groove for at least a portion of the overlapped length of the tooth within the groove. Each coupling is engageable with the teeth of two of the drive shaft, the pump shaft, or the component shaft to mechanically couple the electric motor, the ESP, and the downhole component.

16 Claims, 4 Drawing Sheets

(51) Int. Cl.
*F04D 1/06* (2006.01)
*F16D 1/10* (2006.01)

(52) U.S. Cl.
CPC ........... *F04D 13/086* (2013.01); *F04D 13/14* (2013.01); *F04D 29/054* (2013.01); *F16D 3/10* (2013.01); *F04D 1/06* (2013.01); *F16D 2001/103* (2013.01)

(58) Field of Classification Search
CPC ...... F16D 3/185; E21B 43/128; E21B 17/046; E21B 17/02; F04B 17/03; F04B 47/06; F04D 13/10; F04D 29/054; F04D 13/02; F04D 13/021; F04D 13/086; F04D 29/0405; Y10T 403/1624
See application file for complete search history.

(56) References Cited

U.S. PATENT DOCUMENTS

| | | | |
|---|---|---|---|
| 7,445,429 B2 | 11/2008 | Wilson et al. | |
| 8,545,125 B2 | 10/2013 | Brown et al. | |
| 8,591,205 B2 * | 11/2013 | Brown | E21B 43/128 417/423.6 |
| 9,353,753 B2 | 5/2016 | Wilson et al. | |
| 9,920,773 B2 * | 3/2018 | Wilson | F04D 13/062 |
| 11,149,535 B2 | 10/2021 | Brown et al. | |
| 2009/0291001 A1 * | 11/2009 | Neuroth | F04B 17/03 417/410.1 |
| 2009/0291003 A1 | 11/2009 | Brown et al. | |
| 2010/0303537 A1 * | 12/2010 | Brown | F16D 1/02 403/14 |
| 2013/0101447 A1 * | 4/2013 | Brown | F04B 17/03 29/888.02 |
| 2013/0343933 A1 | 12/2013 | Brown et al. | |
| 2014/0127053 A1 | 5/2014 | Sheth et al. | |
| 2016/0186731 A1 * | 6/2016 | Meyer | F04B 47/06 417/415 |
| 2016/0369847 A1 * | 12/2016 | Trombat | F16D 1/10 |
| 2017/0219014 A1 * | 8/2017 | Strattan | F16D 1/101 |
| 2017/0241480 A1 * | 8/2017 | Parmeter | E21B 43/128 |
| 2020/0072296 A1 * | 3/2020 | Mack | F04D 13/10 |
| 2021/0148410 A1 * | 5/2021 | Eppink | F16D 1/112 |
| 2021/0320563 A1 | 10/2021 | Sheth et al. | |

* cited by examiner

ELECTRIC SUBMERSIBLE PUMP (ESP) ASSEMBLY WITH LOAD ABSORBING COUPLING

BACKGROUND

Wells may be drilled to access hydrocarbons pooled in subterranean formations. Sometimes the hydrocarbons may flow naturally to the surface, at least after initially bringing a well on-line after completion. As reservoir pressure drops, however, many wells apply an artificial lift mechanism to assist production of hydrocarbons to the surface. Artificial lift methods comprise electric submersible pumps (ESPs), rod lift, plunger lift, gas lift, charge pumps, and other lift methods incorporated in a production string. ESPs feature an electric motor powered from an electric power source located at a surface proximate to the wellbore, where the electric motor provides mechanical torque to turn a centrifugal pump. The pump lifts the production fluid to the surface. A gas separator may also be included in the ESP assembly and be powered by the electric motor. Further an ESP string may include more than one ESP.

In an ESP string, the drive motor transfers energy to the other components by means of a rotating motor shaft. The motor shaft is coupled to the gas separator shaft which is coupled to the ESP(s) shaft. The shafts are connected by splined couplings located at the connection point of each component. The subsequent reactionary force or torque, when the motor is energized, is applied on the shaft from the stationary inertia of the weight of the rotating components of the pump and liquid, causing twisting of the shafts. The coupling, due to its larger diameter and thereby torsional rigidly, creates a concentration of torque at its end, where the shaft splines extending beyond the coupling. Most shaft breaks on an ESP string are in the spline area of the connections, which extend beyond and are not captured with the larger diameter coupling. The reduced diameter of the shaft splines makes the shaft splines a weak point in the shaft. Shaft breakage is a common problem and perhaps the highest contributor of warranty claims for an ESP string. Additionally, replacing the shaft in the ESP component requires complete tear down and reassembly of the component, while replacing a coupling can be done in the field, significantly reduce the work over and down time of the ESP well.

Accordingly, it is desirable to couple components together in an ESP string to alleviate the issue of failure due to forces from the motor.

BRIEF DESCRIPTION OF THE DRAWINGS

Embodiments of the electric submersible pump (ESP) with torque absorbing coupling are described with reference to the following figures. The same or sequentially similar numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is an electric submersible pump (ESP) assembly with an electric motor, an ESP, and a downhole component all mechanically coupled in a string with torque absorbing couplings coupling the respective driven and driven shafts. The electric motor includes a splined drive shaft that is mechanically coupled to and drives splined shafts for the ESP and the downhole component. Splined couplings couple the shafts for rotary motion by receiving teeth on the shafts within grooves in the splined couplings. The teeth on the shafts are straight-sided tooth splines of a constant depth along the effective length of the teeth. The grooves in the couplings include sidewalls that are angled relative to the central axis of the coupling, which is also the central axis and axis of rotation of the shafts. The angling of the sidewalls in the grooves allows the deformation of at least a portion of the teeth and of the shafts under the load experienced by the startup or operation of the electric motor. Specifically, at least a portion of the grooves is wider than the teeth of the shafts such that the teeth and thus the shafts are allowed to twist relative to the couplings under the torque from the electric motor. In this manner, the load from the operation of the electric motor is spread across the length of the tooth inserted into the coupling, decreasing the stress concentrations experienced with couplings where the groove sidewalls are not angled and the shafts are not allowed to deform. Spreading the load experienced by the shaft across the length of the teeth within the grooves of the coupling thus decreases the likelihood of shaft breakage within the coupling under a given load, thus increasing the shaft load rating for both normal operation of the ESP assembly and in cases of ESP shutoff with resulting back spin protection.

Figure 1:
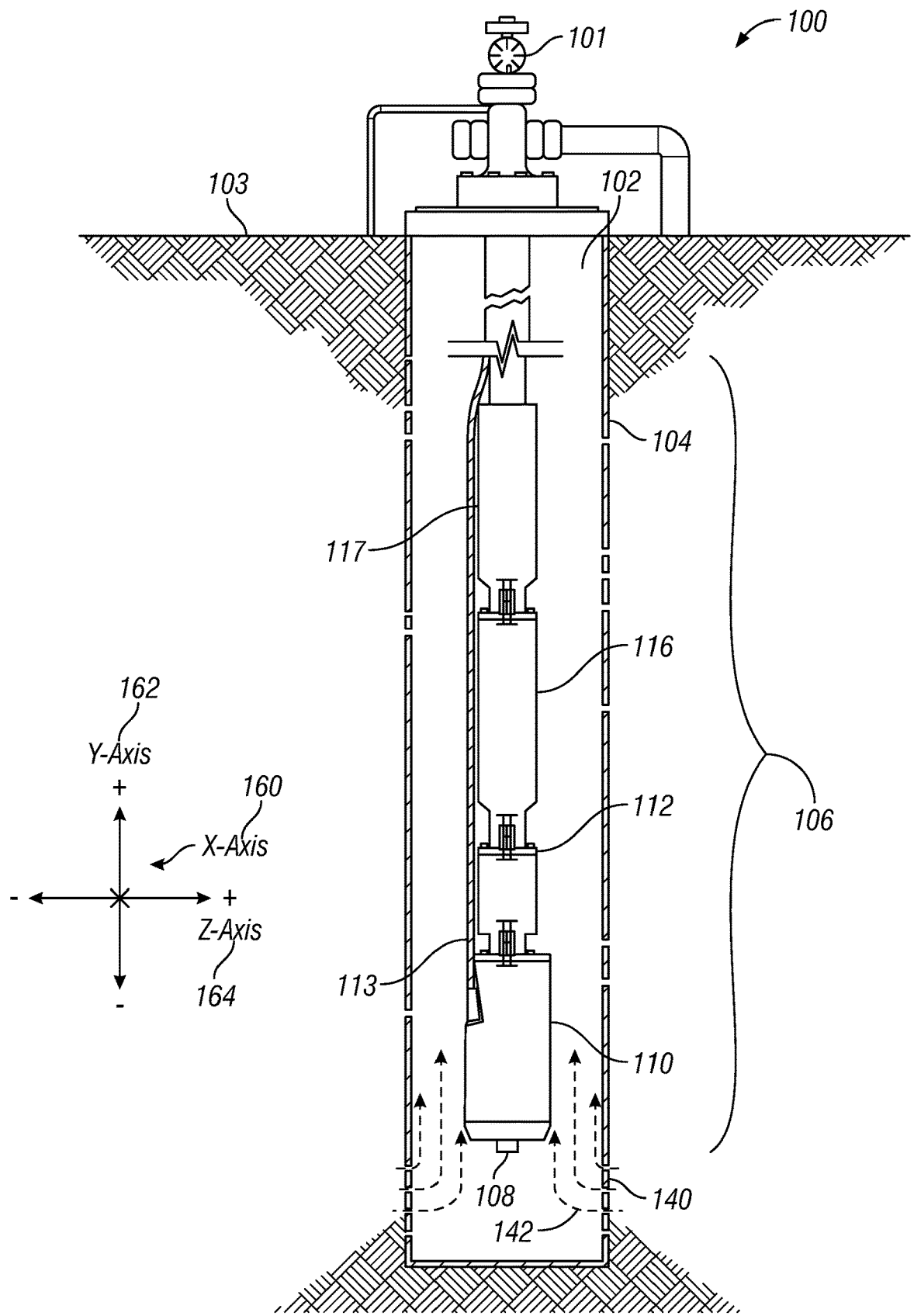
FIG. 1 is an illustration of an exemplary electric submersible pump (ESP) assembly in a wellbore according to an embodiment of the disclosure, according to one or more embodiments.

Turning now to FIG. 1, a producing well environment 100 is described. In an embodiment, the environment 100 comprises a wellhead 101 above a wellbore 102 located at the surface 103. A casing 104 is provided within the wellbore 102. FIG. 1 provides a directional reference comprising three coordinate axes—an X-axis 160 where positive displacements along the X-axis 160 are directed into the sheet and negative displacements along the X-axis 160 are directed out of the sheet; a Y-axis 162 where positive displacements along the Y-axis 162 are directed upwards on the sheet and negative displacements along the Y-axis 162 are directed downwards on the sheet; and a Z-axis 164 where positive displacements along the Z-axis 164 are directed rightwards on the sheet and negative displacements along the Z-axis 164 are directed leftwards on the sheet. The Y-axis 162 is about parallel to a central axis of a vertical portion of the wellbore 102

An electric submersible pump (ESP) assembly 106 is deployed within the casing 104 and comprises an optional sensor unit 108, an electric motor 110, a seal unit 112, an electric power cable 113, a downhole component 116 that is either a first pump or a gas separator, and a pump 117 coupled to a production tubing 120.

The downhole motor 110 may be any suitable electric motor such as induction motor, permeant magnet motor, or axial flux motor. The electric power cable 113 may connect to a source of electric power at the surface 103 and to the electric motor 110 for powering and operating the electric motor 110 in the wellbore 102. The seal unit 112 protects the electric motor 110 from infiltration of reservoir fluid 142 into the interior of the electric motor 110.

The downhole component 116 may be a multi-stage centrifugal pump (ESP) comprising a set of rotating impellers and corresponding stationary diffusers or a gas separator. In an embodiment, the ESP assembly 106 may comprise a plurality of separate ESPs 116 and 117 mechanically coupled together, each ESP 116 and 117 mechanically connected through coupled drive and driven shafts that are rotatable to rotate the impellers and operate the ESPs 116 and 117.

The casing 104 is pierced by perforations 140, and reservoir fluid 142 flows through the perforations 140 into the wellbore 102. The fluid 142 flows downstream in an annulus formed between the casing 104 and the ESP assembly 106, enters the ESP 116, is pumped by the ESP 116, is processed by the optional downhole component 117, and is lifted through the production tubing 120 to the wellhead 101 to be produced at the surface 103.

Figure 2:
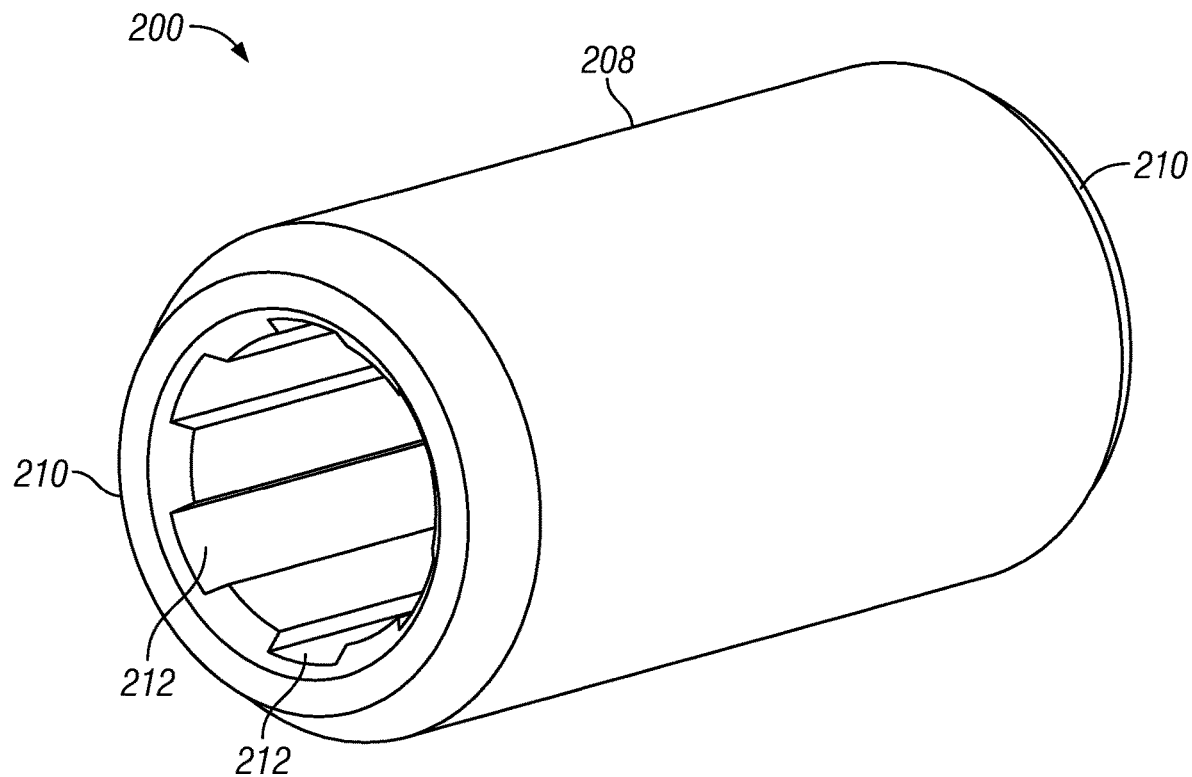
FIG. 2 is an isometric view of a splined coupling, according to one or more embodiments.

FIG. 2 depicts an isometric view of a splined coupling 200 for coupling the rotating drive and driven shafts of the motor 110, the seal unit 112, the ESP 116, and the optional downhole component 117. As shown, the splined coupling 200 includes a body 208 with ends 210. The coupling 200 is hollow through the body 208 and splined with grooves 212 cut into an interior surface of the body 208 and extending at a constant depth through the coupling 200.

Figure 3:
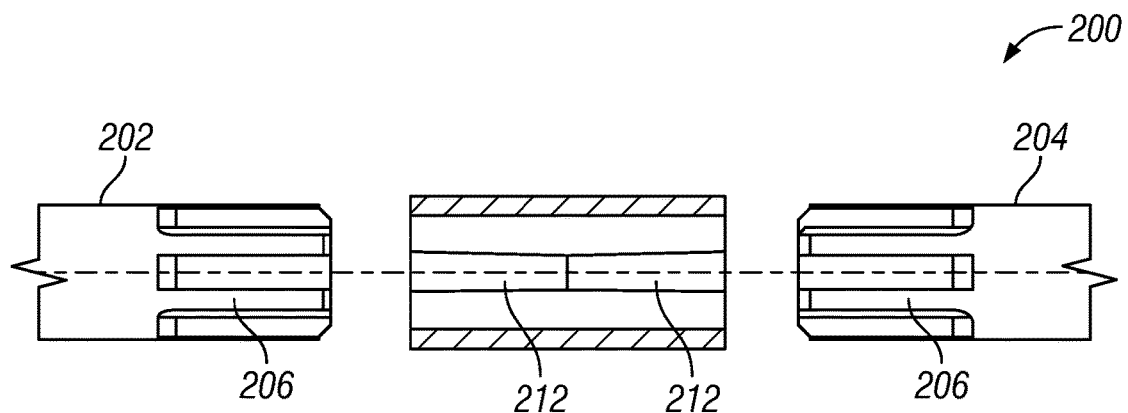
FIG. 3 is a cross section view of a coupling and side views of two shafts to be inserted in the coupling, according to one or more embodiments.
Figure 4:
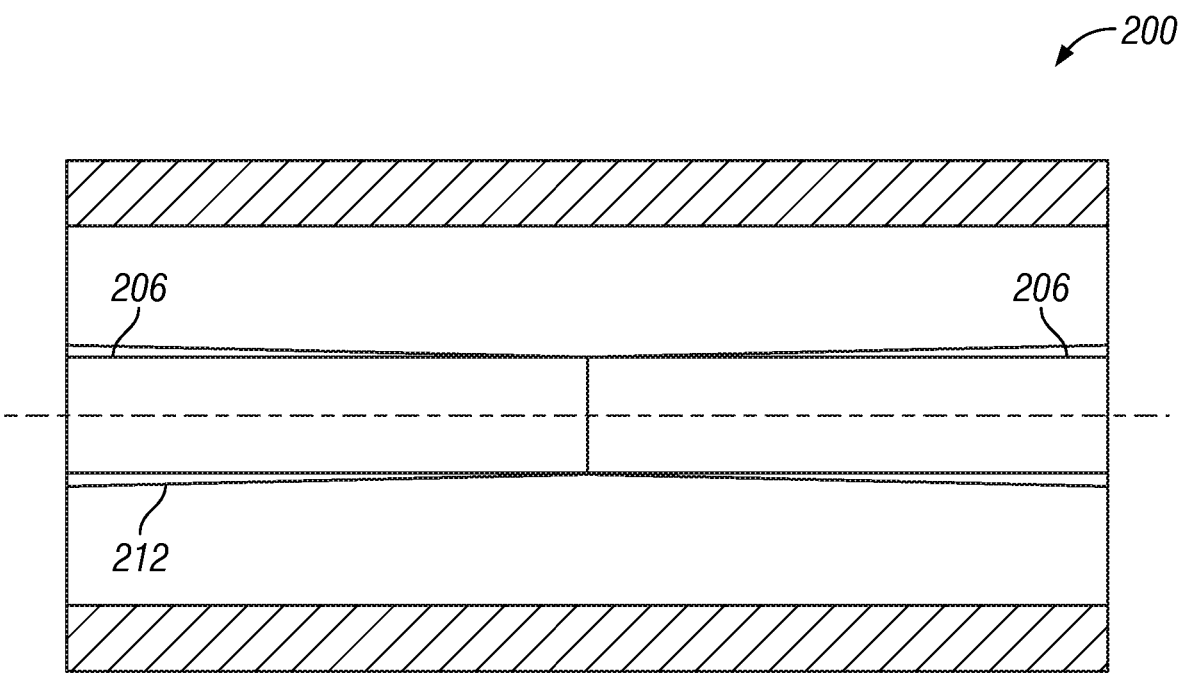
FIG. 4 is a schematic illustration of two shafts inserted into a coupling, according to one or more embodiments.

FIGS. 3 and 4 illustrate using the splined coupling 200 to couple a drive shaft 202 and a driven shaft 204. Each of the drive shaft 202 and the driven shaft 204 include teeth 206 formed by cutting grooves into the shafts. In this manner, the teeth 206 are of the same outer dimension as the outer diameter of the shafts 202, 204. Each shaft 202 and 204 also includes a central axis that is also the axis of rotation of each shaft. The teeth 206 are parallel-, or straight-, sided tooth splines. The teeth 206 are also formed such that the depth along the effective length of each of the teeth 206 (at least the length designed to engage the coupling 200) is constant and parallel to the central axis of the shafts 202, 204 when viewed from the side of each tooth 206. Additionally, the length each tooth 206 is parallel to the central axes of the shafts 202, 204 when viewed from the top of each tooth 206. In the embodiment shown in FIGS. 3 and 4, each shaft 204 and 204 may include, for example, six splines arranged equally-spaced around the circumference of the shafts 202, 204.

The shafts 202 and 204 are mechanically coupled to each other by inserting the shafts into the coupling 200 such that the teeth 206 of the shafts fit into the grooves 212 of the coupling 200. The teeth 206 and grooves 212 allow relative axial movement between the shafts 202, 204 and the coupling 200 but transfer rotational movement. Thus, when coupled, rotation of the drive shaft 202 is translated into rotation of the driven shaft 204 through the coupling 200.

FIG. 4 is a schematic illustration of shaft teeth 206 inserted into a groove 212 of the coupling 200 from both ends. As shown, the coupling 200 includes a central axis and a groove 212 that extends through the length of the coupling 200. Each of the grooves 212 in the coupling 200 has a cross-section profile that includes groove sidewalls cut to a constant depth within the body 208 of the coupling 200. The grooves 212 are arranged such that the depth along the effective length of each of the grooves 212 (at least the length designed to engage the shafts 202, 204) is constant and parallel to the central axis of the coupling 200 when viewed from the side of each groove 212. Unlike the teeth 206, the groove sidewalls are angled relative to the central axis of the coupling 200, providing a space on either side of each tooth 206 in the groove 212 for at least a portion of the overlapped length of the teeth 206 within the groove 212. The angle of each sidewall may be any suitable angle relative to the central axis of the coupling 200 for allowing deformation of the shafts 202, 204 as explained below. For example, the angle may be greater than 0 degrees and less than 3 degrees. Also, as shown the sidewalls of the groove 212 are tapered from relatively wider portions of the groove 212 at the ends 210 of the coupling 200 to a relatively narrow portion of the groove 212 at the center of the coupling 212. Thus, the sidewalls of each groove 212 in the coupling 200 shown in FIG. 4 are symmetrical relative to the central axis of the coupling 200. Although shown as straight, the sidewalls of each groove may also be curved.

Figure 5:
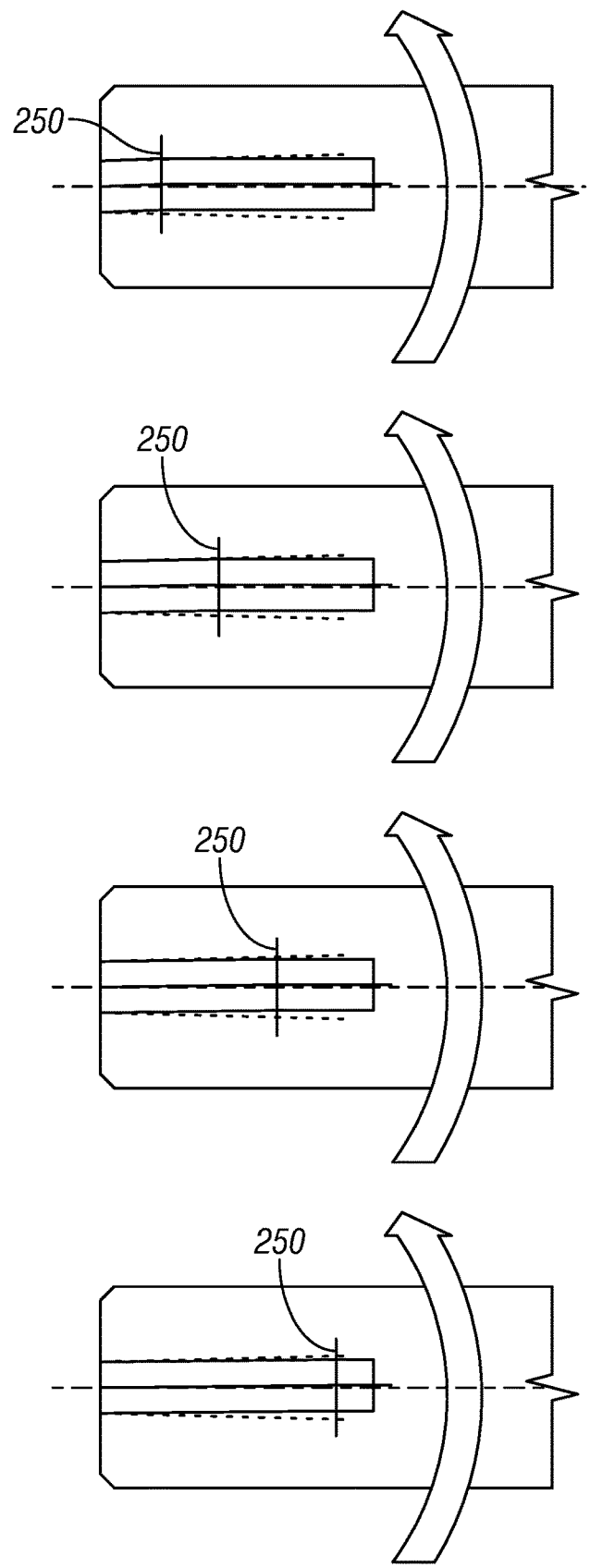
FIG. 5 is a series of schematic images showing increasing torque load across a shaft and contact points where the shaft load travels down the length of a coupling as the load is increased, according to one or more embodiments.

As shown in FIG. 5, as a drive (or driven) shaft begins to be subject to an increasing torsional load (illustrated by the arrows) such as when the electric motor 110 is started up, the shaft and the teeth undergo deformation within a coupling 200. As shown by the contact points 250 of each image of FIG. 5, the deformation begins at the end of the shaft and travels down the length of the angled coupling groove toward end of the coupling (not shown). With the sidewalls of the grooves angled, the created space allows for a certain amount of deformation of the teeth and thus the shaft along the length of the portion of the tooth within the coupling under the load experienced by the startup or operation of the electric motor. Specifically, because at least a portion of the grooves is wider than the teeth, the teeth and thus the shaft are allowed to twist under the torque from the electric motor. In this manner, the load from the operation of the electric motor is spread across the length of the tooth inserted into the coupling, decreasing the stress concentrations experienced with couplings where the groove sidewalls are not angled and the shafts are not allowed to deform. Spreading the load experienced by the shaft across the length of the teeth within the grooves of the coupling thus decreases the likelihood of shaft breakage within the coupling under a given load, thus increasing the shaft load rating for both normal operation of the ESP assembly and in cases of ESP shutoff with resulting back spin protection.

Examples of the above embodiments include:

Example 1. An electric submersible pump (ESP) assembly, comprising: an electric motor comprising a splined drive shaft comprising drive shaft teeth; an ESP mechanically coupled to the electric motor and comprising a splined ESP shaft comprising ESP shaft teeth; a downhole component mechanically coupled to the electric motor and comprising a splined component shaft comprising component shaft teeth; and splined couplings each comprising a central axis and grooves through the coupling comprising groove sidewalls sized to receive the shaft teeth and being angled relative to the central axis to form a space on either side of each tooth in each groove for at least a portion of the overlapped length of the tooth within the groove; wherein each coupling is engageable with the teeth of two of the drive shaft, the pump shaft, or the component shaft at a time to mechanically couple the electric motor, the ESP, and the downhole component.

Example 2. The assembly of Example 1, wherein the shaft teeth comprise a constant depth along the effective length of each tooth.

Example 3. The assembly of Example 2, wherein the sidewalls of each groove are symmetrical relative to the central axis of the coupling.

Example 4. The assembly of Example 2, wherein the teeth comprise parallel-sided tooth splines.

Example 5. The assembly of Example 1, wherein the sidewalls of each groove are tapered along the length of each groove.

Example 6. The assembly of Example 5, wherein the sidewalls of each groove are straight.

Example 7. The assembly of Example 5, wherein the sidewalls of each groove are curved.

Example 8. The assembly of Example 1, further comprising at least one of multiple ESPs or multiple downhole components mechanically coupled to the electric motor.

Example 9. A method of producing fluids from a wellbore, comprising: An electric submersible pump (ESP) assembly, comprising: mechanically coupling a splined drive shaft of an electric motor in the wellbore, a splined shaft of an ESP in the wellbore, and a splined shaft of a downhole component in the wellbore, each of the splined shafts comprising teeth; operating the electric motor in the wellbore to drive the ESP and the downhole component; and wherein mechanically coupling further comprises coupling any two of the shafts at a time using a splined coupling comprising a central axis and grooves through the coupling and engageable with the teeth, each groove comprising sidewalls angled relative to the central axis to form a space on either side of each tooth in each groove for at least a portion of the overlapped length of the tooth within the groove.

Example 10. The method of Example 9, further comprising spreading a load on one of the shafts along a length of the teeth inserted into the coupling due to the shape of the sidewalls of the grooves allowing the shaft and teeth to deform within the grooves.

Example 11. The method of Example 10, wherein the load is produced from starting up the electric motor.

Example 12. The method of Example 9, wherein the shaft teeth comprise a constant depth along the effective length of each tooth.

Example 13. The method of Example 9, wherein the sidewalls of each groove are symmetrical relative to the central axis of the coupling.

Example 14. The method of Example 12, wherein the sidewalls of each groove are tapered along the length of each groove.

Example 15. The method of Example 12, wherein the sidewalls of each groove are straight or curved.

Example 16. A splined coupling for mechanically coupling a splined drive shaft and a splined driven shaft, the coupling comprising a coupling body comprising a central axis and grooves through the coupling and comprising groove sidewalls tapered relative to the central axis.

Example 17. The coupling of Example 16, wherein the sidewalls of each groove are symmetrical relative to ends of the coupling.

Example 18. The coupling of Example 16, wherein the sidewalls of each groove are tapered along the length of each groove.

Example 19. The coupling of Example 16, wherein the sidewalls of each groove are straight or curved.

Example 20. The coupling of Example 16, wherein the grooves comprise a constant depth along the effective length of the groove.

Certain terms are used throughout the description and claims to refer to particular features or components. As one skilled in the art will appreciate, different persons may refer to the same feature or component by different names. This document does not intend to distinguish between components or features that differ in name but not function.

While compositions and methods are described herein in terms of "comprising" various components or steps, the compositions and methods can also "consist essentially of" or "consist of" the various components and steps.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. An electric submersible pump (ESP) assembly, comprising:
    an electric motor comprising a splined drive shaft comprising parallel-sided and straight-sided profile drive shaft teeth comprising a constant depth along an effective engagement length of each tooth with respect to the splined drive shaft;
    an ESP mechanically coupled to the electric motor and comprising a splined ESP shaft comprising parallel-sided and straight-sided profile ESP shaft teeth comprising a constant depth along the effective engagement length of each tooth with respect to the splined ESP shaft;
    a downhole component mechanically coupled to the electric motor and comprising a splined component shaft comprising parallel-sided and straight-sided profile component shaft teeth comprising a constant depth along the effective engagement length of each tooth with respect to the splined component shaft; and
    splined couplings each comprising a body that is hollow through the body and comprising a central axis and grooves through the entire coupling, each groove comprising straight-sided profile groove sidewalls angled laterally relative to the central axis to form a space on either side of each drive shaft, ESP shaft, or component shaft tooth in each groove for at least a portion of the overlapped length of the tooth within the groove,
    wherein each coupling is engageable with the teeth of two of the drive shaft, the pump shaft, or the component shaft at a time to mechanically couple the electric motor, the ESP, and the downhole component.

2. The assembly of claim 1, wherein the sidewalls of each groove are symmetrical relative to the central axis of the coupling.

3. The assembly of claim 1, wherein the sidewalls of each groove are tapered along the length of each groove.

4. The assembly of claim 3, wherein the sidewalls of each groove are straight.

5. The assembly of claim 3, wherein the sidewalls of each groove are curved.

6. The assembly of claim 1, further comprising at least one of multiple ESPs or multiple downhole components mechanically coupled to the electric motor.

7. A method of producing fluids from a wellbore, comprising:
mechanically coupling a splined drive shaft of an electric motor in the wellbore, a splined shaft of an electric submersible pump (ESP) assembly in the wellbore, and a splined shaft of a downhole component in the wellbore, each of the splined shafts comprising parallel-sided and straight-sided profile teeth comprising a constant depth along an effective engagement length of each tooth with respect to the splined shafts;
operating the electric motor in the wellbore to drive the ESP and the downhole component; and
wherein mechanically coupling further comprises coupling any two of the shafts at a time using a splined coupling comprising a body that is hollow through the body and comprising a central axis and grooves through the entire coupling and engageable with the teeth, each groove comprising straight-sided profile sidewalls angled laterally relative to the central axis to form a space on either side of each tooth in each groove for at least a portion of the overlapped length of the tooth within the groove.

8. The method of claim 7, further comprising spreading a load on one of the shafts along a length of the teeth inserted into the coupling due to the shape of the sidewalls of the grooves allowing the shaft and teeth to deform within the grooves.

9. The method of claim 8, wherein the load is produced from starting up the electric motor.

10. The method of claim 7, wherein the sidewalls of each groove are symmetrical relative to the central axis of the coupling.

11. The method of claim 7, wherein the sidewalls of each groove are tapered along the length of each groove.

12. The method of claim 7, wherein the sidewalls of each groove are straight or curved.

13. A splined coupling for mechanically coupling a splined drive shaft and a splined driven shaft both with teeth, the coupling comprising a coupling body that is hollow through the body and comprising a central axis and grooves through the entire coupling, each groove comprising straight-sided profile groove sidewalls angled laterally relative to the central axis to form a space on either side of each splined drive shaft tooth or each splined driven shaft tooth in each groove for at least a portion of an overlapped length of the tooth within the groove.

14. The coupling of claim 13, wherein the sidewalls of each groove are symmetrical relative to ends of the coupling.

15. The coupling of claim 13, wherein the sidewalls of each groove are straight or curved.

16. The coupling of claim 13, wherein the grooves comprise a constant depth along a length of each groove.

\* \* \* \* \*